April 15, 1952 G. M. VALE 2,592,979
ELECTRICALLY CONTROLLED SYSTEM AND AUTOMATIC
MACHINE FOR REPETITION WORK
Filed Sept. 29, 1947 5 Sheets-Sheet 1

INVENTOR
G. M. VALE
BY
Seascoch Downing Seebold
ATTYS

April 15, 1952     G. M. VALE     2,592,979
ELECTRICALLY CONTROLLED SYSTEM AND AUTOMATIC
MACHINE FOR REPETITION WORK
Filed Sept. 29, 1947     5 Sheets-Sheet 3
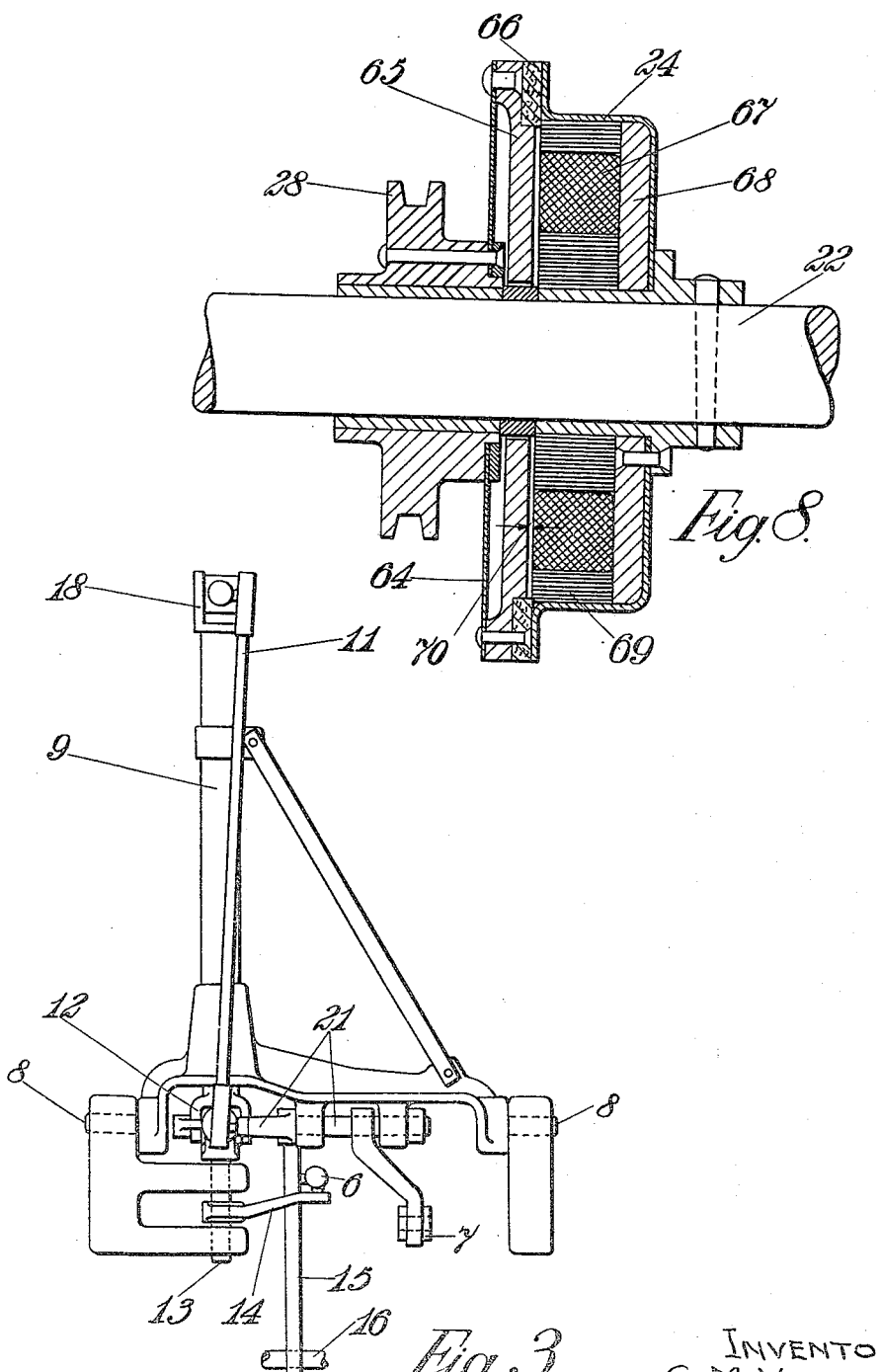
INVENTOR
G. M. VALE April 15, 1952
G. M. VALE
2,592,979
ELECTRICALLY CONTROLLED SYSTEM AND AUTOMATIC
MACHINE FOR REPETITION WORK
Filed Sept. 29, 1947
5 Sheets-Sheet 4
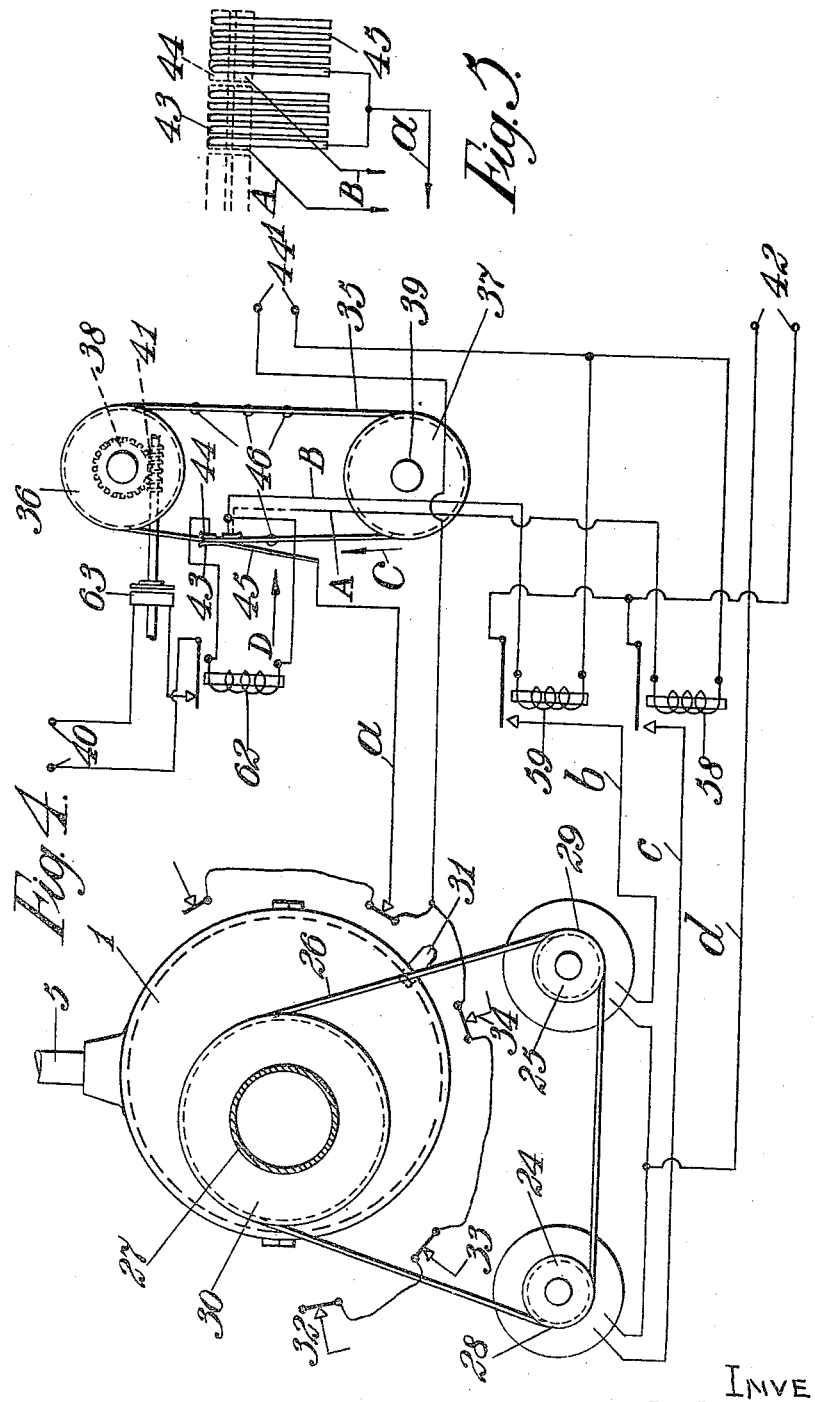
INVENTOR
G. M. VALE
BY
Glascock Downing & Seebold
ATTYS.

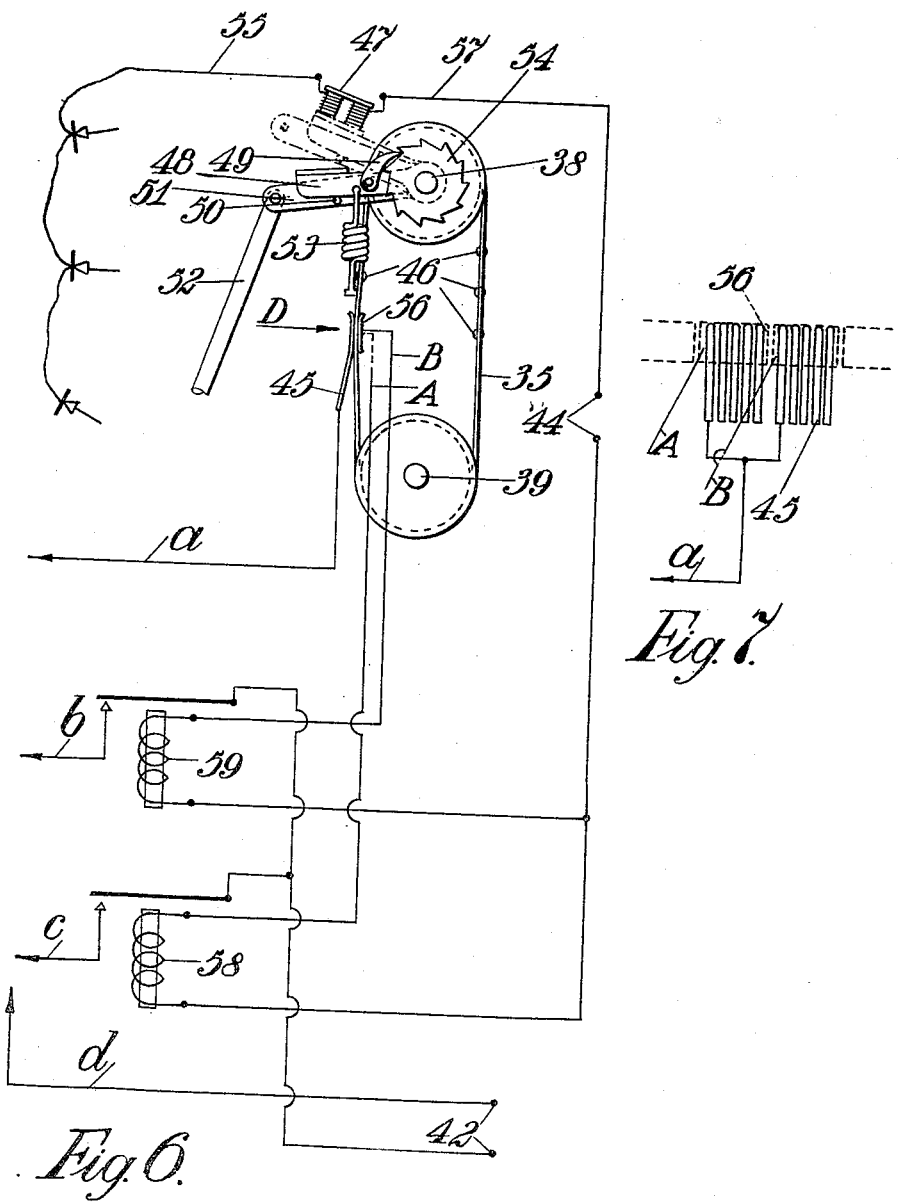

Patented Apr. 15, 1952

2,592,979

UNITED STATES PATENT OFFICE 2,592,979

ELECTRICALLY CONTROLLED SYSTEM AND AUTOMATIC MACHINE FOR REPETITION WORK

George Mark Vale, Saint Neots, England

Application September 29, 1947, Serial No. 776,704
In Great Britain October 7, 1946

10 Claims. (Cl. 74—1)

This invention relates to an electrically controlled system and automatic machine intended for repetition work.

It consists more particularly in providing a machine which substitutes for the human operator automatic means which is quick in operation and not only improves operation and efficiency but greatly simplifies operational functions, and considerably reduces the cost of production.

More particularly the machine is intended to take the place of the human operator on repetition work, which can be split up into a sequence of movements as in motion study. For example, in the machine shop this would be the automatic operation of machine tools on simple repetition work, i. e. where the work is loaded into a fixture on the machine, clamped, the machine started and on the completion of the machining cycle removed and placed in a receptacle. Or, for example, the trying of a component in a series of "go" and "not go" gauges using the frame gauging system with the addition of electrical contacts for selecting rejects.

For handling components, blanks, etc. the machine is provided with a tubular work arm carrying a work holder at the lower end, this arm being adjustable for position and mounted on a hinged frame, preferably of triangular construction. The arm may be moved in three dimensions, each movement being stopped at any point or movements take place in any desired combination and sequence.

With the above in view the present invention consists in a control system for carrying out a sequence of movements necessary for automatic operation of a machine, tool or the like used for repetition work, comprising a group of eccentrics in combination with electro-mechanical means adapted to operate the said eccentrics, in a predetermined sequence for predetermined times.. The invention also consists in an electrically controlled automatic machine intended for repetition work.

In the accompanying drawings disclosing one form by way of example in which the invention may be embodied:

Figure 3 is a plan view;

Figure 4 is a schematic diagram of the control unit;

Figure 5 is a partial sectional view looking in the direction of the arrow D, Figure 4.

Figure 6 is a view similar to Figure 4 showing a modified form;

Figure 7 is a partial sectional view looking in the direction of the arrow D, Figure 6; and Figure 8 is a detailed sectional view showing particularly the electro-magnetic clutch of any one eccentric.

Figure 1:
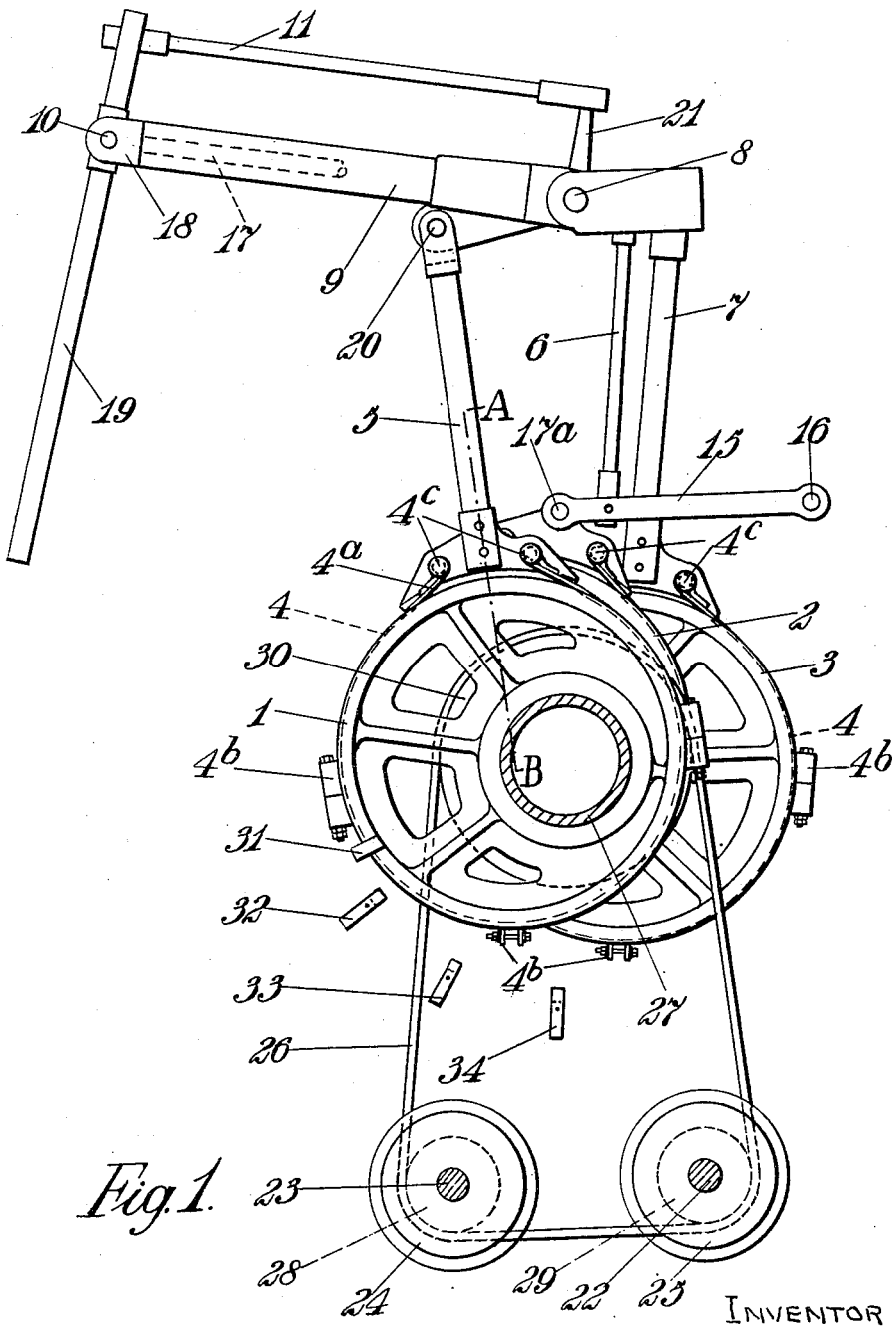
Figure 1 is a side view of the automatically controlled mechanism in accordance with the invention, and showing the adaptation thereof with respect to a machine tool.
Figure 2:
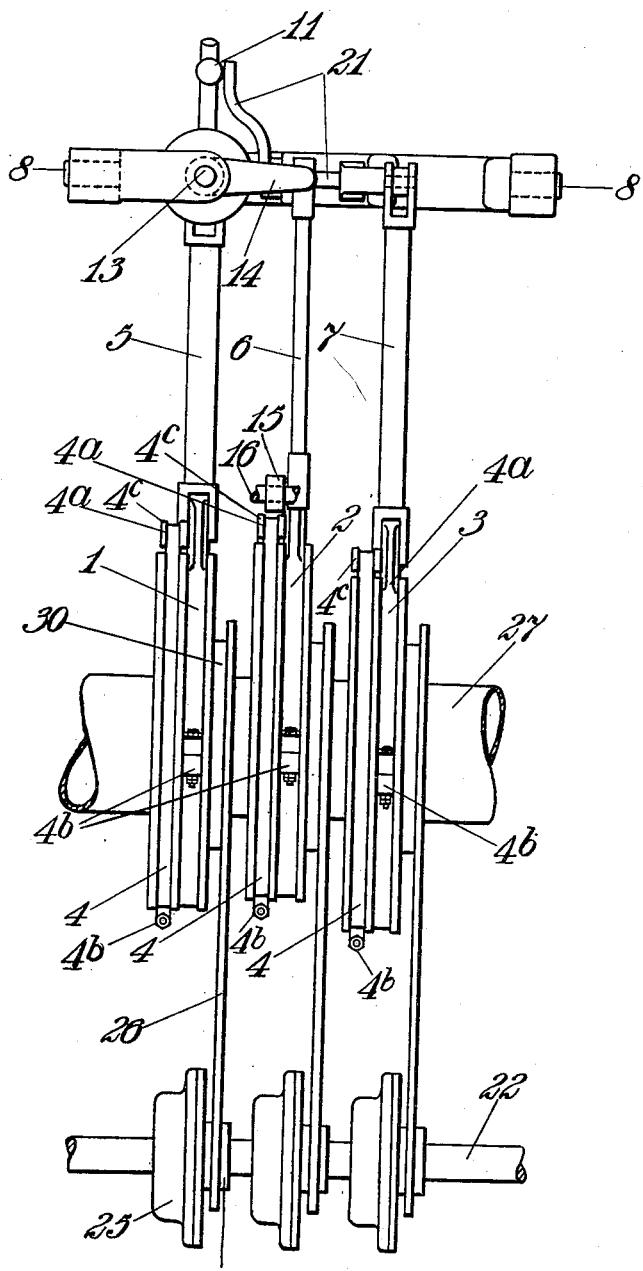
Figure 2 is a rear view.

Referring now to Figures 1 to 3, 1, 2 and 3 are eccentrics which are adapted to rotate on a stationary shaft 27 in a pre-arranged sequence through the medium of electrically operated clutches, more particularly referred to hereinafter. The shaft 27 preferably has a diameter equal to or exceeding twice the eccentricity of the eccentric, so that the centre of pressure of the eccentric is always inside the bearing diameter. The eccentrics are used to operate a work arm 19 in all directions. The work arm may carry a work holder, tool or other means of attachment to machines according to the repetition work to be produced. More than one work arm or groups of eccentrics may be used according to requirements.

Power to rotate the eccentrics is supplied through electrically operated friction clutch means of any suitable design; a preferred arrangement of eccentrics and clutches is shown in Figure 1, in which the eccentric 1 is free to rotate on the shaft 27, the former being driven by either shafts 22 or 23, which are arranged to rotate in opposite directions and on which are mounted electro-magnetic clutches 24, 25, respectively. These clutches are coupled to the eccentric by a chain or belt 26 which passes over wheels or sprockets 28, 29 and 30 and the arrangement is such that when one of these clutches is actuated by a control unit, hereinafter referred to, the eccentric is permitted to rotate in one direction until a previously selected stop contact, associated with the control unit is opened.

The construction of the electro-magnetic clutches 24, 25 is more particularly shown in Figure 8, wherein a thin steel disc 64 is fixed to the sprocket 28 and to an iron armature 65 with a friction lining 66 fixed to the latter — this assembly being free on the shaft 22. Within clutch casing 24, in a winding 67, an iron disc 68 and a coil of soft iron strip material 69. The clutch is faced with a non-magnetic material and has a large air gap at 70 between the armature and the electro-magnet. The stop contacts are shown diagrammatically at 32, 33 and 34 etc. in Figure 1 and in normal position are closed, and 31 indicates a contact arm projecting from the rim of the eccentric 1 to be moved in operable relationship therewith. These contacts may in practice be actuated by any moving part of the machine.

To ensure that the rotation of the eccentric ceases at the selected position, sufficient friction is introduced to damp out the momentum of the moving parts, and one convenient method is to use spring-loaded friction bands 4 (Figure 1), each fitting in a groove of the eccentric with the ends hingedly attached to a lug 4c on the eccentric strap 4a made in halves for bolted assembly about the eccentric. The friction band is constructed in halves pulled together by adjustable means 4b to vary the amount of friction. To lock the movement when the mechanism is stationary the centre of pressure of the eccentric is arranged to be inside the bearing diameter as indicated by line A—B (Figure 1). By adding friction damping and arranging the centre of pressure inside the bearing diameter, an accurate and self-locking movement is obtained. Alternatively, friction only may operate to prevent partial rotation.

The eccentric 1 actuates by means of rod 5, hingedly connected at 20, a triangular frame 9, pivoted at 8. Work arm 19 is adjustably mounted on the frame 9, and will be raised and lowered by the rocking of the frame about the pivot 8. The work arm 19 is moved from side to side by partial rotation of shaft 17 adapted to rotate within the frame 9 and suitably connected at its forked end 18 with the work arm 19 and at its other end by universal joint 12 with shaft 13, the latter being connected by lever 14 and ball jointed connecting rod 6 to a rocking lever 15 hingedly connected at one end 17a to the eccentric 2 and at the other end with a pin 16 fixed on the frame of the machine. The work arm is moved to and fro on pivot 10 operated by a ball jointed connecting rod 11, pivoted crank and shaft assembly 21, which latter connects by rod 7 with the eccentric 3. The work arm 19 is suitably mounted so as to be made adjustable with respect to length and position.

Additional eccentrics may operate through flexible cables, or flexible shafts may operate a work holder, grip or tool on the arm 17 according to requirements.

The electrical control means for energising the electro-magnet clutches consist of a group of open start contacts connected in parallel in each electro-magnetic circuit. The contacts may be closed in any pre-arranged sequence by means of studs or holes, suitably arranged on a moving belt, rotating drum or disc. In series with each start contact there is a closed stop contact such as 32, 33 and 34 previously referred to with reference to Figure 1. These start and stop contacts may operate directly in the electro-magnetic circuit or through electrical relays. The belt, drum or disc may be moved intermittently by a ratchet mechanism or continuously through an electrically operated clutch.

Figure 4 embodies a continuously moving control belt 35 and illustrates a schematic diagram of one embodiment. The belt drive is through power supply 40 to a small magnetic clutch 63 energized by a relay 62 with a worm drive 41; in normal position the relay 62 is closed. The control belt, made of flexible non-conducting material, is arranged over drums 36, 37 which are adapted to be slowly rotated on spindles 38, 39 respectively by means of suitable chains and sprockets (not shown) driven by the belt drive. The belt 35 passes a contact bar 43, 44 arranged in a control circuit with power supply 44', which bar is divided into sections insulated from each other; two sections of the contact bar being used for each eccentric, with two sets of flexible metal brushes 45 pressing against the belt 35 at this point; the brushes being connected in parallel in pairs to the stop contacts 32, 33, 34 etc. aforesaid and each section of the contact bar by wiring b and c respectively to the electro-magnetic clutches 24, 25 through a relay, wiring d being connected to power supply 42. Figure 5 shows a view of the brushes and contact bar sections as seen in the direction of the arrow D (Figure 4), in which wire A from one section of the contact bar 43, 44 is connected in circuit with a clutch relay 58 and wire B connected with a clutch relay 59, and wire a connected with the stop contact; these relays being open in normal position. Metal contact studs 46 are fitted to the belt at appropriate positions and these studs together with the associate brushes constitute the start contacts aforesaid to close the required circuit through either relays 58, 59 which in turn actuate the clutches 24, 25. It will be understood that a metal stud on the belt will select a brush that is connected to the required stop contact for the position at which the eccentric is to stop and that the section of the contact bar which is connected to the relay will close its associated clutch to effect rotation of the respective eccentric in the desired direction. To change the movements for different work in hand all that is necessary is to change the belt; the movements being first planned and then a belt made up with all the necessary contact studs thereon.

When the machine is in operation with the control belt 35 moving in the direction of the arrow C and a metal stud 46 is brought into position between the contact brush 45 and the contact bar 43, 44, an electric circuit is established through the relay 58 and a closed stop contact 32, 33, 34, etc.; energization of this relay serves to close the circuit of the electro-magnetic clutch 24. Rotation of the armature and of said clutch 24 moves the eccentric 1 by means of the chain or belt 26 and the eccentric in turn moves that portion of the work arm to which it is coupled. The eccentric in rotating brings the projecting arm 31 against the stop contacts aforesaid and thus opens the contact which is in circuit with the start contact whereby the circuit through the relay 58 is broken and causing its associated clutch 24 to be de-energized. As the drive to the rotating drums 36, 37 over which the belt 35 passes is through the magnetic clutch 63 energized through the relay 62 and the winding of this relay bridges the two sections of the contact bar 43, 44, the arrangement is such that should a contact stud move onto the second portion of the contact bar 43, 44 before the machine has completed that movement intended for it, the current passes through the relay winding and opens the circuit of the magnetic clutch 63, thus causing the belt to become stationary until that movement has been completed. The combination of this function with a suitable slip setting for the main clutches enables the machine to stop and wait upon meeting any obstruction or overload.

A modified construction embodying a ratchet feed for intermittent drive of the control belt is shown in Figure 6, which shows a ratchet wheel 54 attached to the drum and suitably engaged by a pawl 49. An arm 51, mounted on the spindle 38, is operatively connected by rod 52 with a rotating member such as driving shaft 22 or 23 (Figure 1), and a free ratchet arm 48, carrying the pawl 49, is loaded by a spring 53, there being a peg 50 also carried by the arm, the latter being adapted to co-operate with an electro-magnet 47 having a common lead 55 to the stop contacts aforesaid and a lead 57 to the power supply 44'. Instead of co-operating with divided contact bars as in Figure 4, the belt 35 in this case is associated with single contact bars 56, flexible metal brushes 45 pressing against the belt, two brushes for each stop contact. Figure 7 shows a view of the brushes and contact bar 56 as seen in the direction of the arrow D (Figure 6) in which wire A is connected in circuit with one of the clutch relays 58, 59 and wire B connected with the other of said clutch relays. The operation of this arrangement is as follows: The control current is allowed to pass through the electromagnet 47, which holds up the free ratchet arm 48, during the waiting period, until the circuit is broken by the completion of all necessary movements for that position of the control belt. During the period of release of the ratchet arm 48, the arm 51 is continuously rocked by the rod 52 driven by the rotating member, and this arm moves the ratchet arm 48 and the pawl 49 by contact with the peg 50, the ratchet arm being returned by the spring 53. The ratchet wheel 54 being attached to the drum rotates it intermittently through a distance equal to the spacing of the contact studs on the belt.

It will be understood that the above methods of causing the control feed to wait together with the prearranged clutch slip will enable the mechanism to stall or move at reduced speed under excess load without interference with the sequence of movements.

It is also to be understood that in setting up the mechanism, the work to be done is split up into individual movements as in motion study and the positions of the contact studs on the belt together with the electrical start and stop contacts will be arranged accordingly.

One example of a use for the machine is as follows: In the machine shop where it is contemplated loading and operation of a second operation lathe of the type that makes a complete cycle of movements of the cutting tools on the moving of a starting lever, use is made of the automatic machine with one work arm and work holder operating by one set of eccentrics and another set of eccentrics arranged for connection with the controls of the lathe, the connection being made for example by means of Bowden type cables. Then assuming that the component to be turned is made from a round steel bar, that in the first operation the bar has been cut to length and one end centre drilled and that in the second operation various diameters are to be turned with a multi-tool box. Under such conditions blanks are placed in a hopper near to the lathe. The work arm moves into position and the holder grips a blank, the blank is then lifted, brought over the lathe and lowered into position between the lathe centre and chuck.

The tailstock centre is then operated by one of the eccentrics, the blank being pushed forward the required distance into the headstock chuck (the work holder releases sufficiently to allow this) a second eccentric then closes the chuck which can be of any type suited for operation by the movement of a lever, i. e. draw-back or air-operated type.

The work arm then moves clear and a third eccentric operates the starting lever of the lathe.

The automatic machine now waits until the lathe has completed its cutting traverse and in doing so has opened a stop contact attached to the lathe and in circuit with the control system. The work arm next moves to the turned component, the work holder closes, the tailstock centre retracts and the chuck opens by movements of the appropriate eccentrics, next the component is lifted clear and placed in a container.

The aforesaid cycle of movements is then repeated.

A second example in which operation of a power press is envisaged, the work intended by the machine is the raising of a part that has been previously blanked. For this, blanks would be placed in a simple hopper and lifted one at a time by the work arm of the machine, the press being run continuously and the blanks placed in the die by the work arm during the upward movement of the press. Correct timing is obtained by the use of a stop contact on the press and in the control circuit, this contact being opened by the upward movement of the press, thereby allowing the work arm to place the blank in position in the die during the period that the punch is out of the die, use being made of a push through type of die.

I claim:

1. A machine for automatic operation of a reproducer device for giving a series of different movements in a predetermined sequence comprising in combination, at least one eccentric, a reproducer device operatively connected with said eccentric, said eccentric carrying an eccentric strap, a stationary shaft having a large diameter with respect to the eccentricity of the eccentric and on which said eccentric is rotatably mounted thereon to perform a large throw, means to operate the eccentric in a clockwise direction, means to operate said eccentric in a counterclockwise direction, and friction means carried by the eccentric strap to act upon the eccentric so as to damp out momentum of moving parts, thereby stopping the eccentric at a selected position.

2. A control system for carrying out a sequence of movements necessary for automatically controlling a reproducer device of the character described, said system including at least one eccentric operatively connected with the reproducer device and carrying a contact arm, a stationary shaft on which said eccentric is freely mounted, means to operate the eccentric including electro-magnetic friction clutches, said system including a plurality of contact means and relays in circuit with said electro-magnetic friction clutches, one contact means being normally closed and the other normally open, a record device having contact means in pre-arranged position, and means for moving said member to bring its contact means into operative relation to close said open contact means for energization of a selected clutch, thereby displacing said eccentric, said contact arm opening said closed contact means when said eccentric reaches a predetermined point for de-energizing said selected clutch, thereby stopping the eccentric.

3. A machine for electrically controlling a sequence of movements necessary for automatic operation in repetition work comprising a reproducer device, a driving element such as an eccentric operatively connected with said reproducer device, means driving said element including electro-magnetic friction clutches, and an electrical control circuit including said clutches and having separate means to alternatively open and close said circuit, one of said separate means comprising an operatively moving record device and contact means to perform a closing operation of said circuit, 4. Control system for carrying out a sequence of movements necessary for automatically controlling a reproducer device of the character described, said system including at least one eccentric operatively connected with the reproducer device and carrying a contact arm, a stationary shaft on which said eccentric is freely mounted, means to operate the eccentric including electromagnetic friction clutches, said system including a plurality of contact means and relays in circuit with said electro-magnetic friction clutches, one contact means being normally closed and the other normally open, a record device having contact means in pre-arranged position, and means for moving said record device to bring its contact means into operative relation to close said open contact means for energization of a selected clutch, thereby displacing said eccentric, said contact arm opening said closed contact means when said eccentric reaches a predetermined point for de-energizing said selected clutch, thereby stopping the eccentric, said normally open contact means including a contact bar divided into sections with brushes connected in parallel in pairs with said normally closed contact means.

5. A machine for electrically controlling a sequence of movements necessary for automatic operation in repetition work comprising a reproducer device, a driving element such as an eccentric operatively connected with said reproducer device, means driving said element including electro-magnetic friction clutches, and an electrical control circuit including said clutches and having separate means to alternatively open and close said circuit, one of said separate means comprising an operatively moving record device and contact means to perform a closing operation of said circuit, said contact means including pre-arranged contacts on the operatively moving record device, a contact bar divided into two sections, and brushes connected in parallel in pairs with said other separate means, said other separate means embodying a contact arm on the said driving element and at least one stop contact which is closed in normal position but which is opened to stop said driving element when contact is made with it by said contact arm.

6. A machine according to claim 5, in which the drive of the operatively moving record device is through a power supply and an electro-magnetic clutch energized by a relay, said relay having a winding bridging the two sections that upon contact being made onto the second section before the machine has completed that movement intended for it, current will pass through the winding and open the circuit of said latter clutch, thereby causing the said operatively moving record device to become stationary until that movement has been completed.

7. A machine for electrically controlling a sequence of movements necessary for automatic operation in repetition work comprising a reproducer device, a driving element such as an eccentric operatively connected with said reproducer device, means driving said element including electro-magnetic friction clutches, and an electrical control circuit including said clutches and having separate means to alternatively open and close said circuit, one of said separate means comprising an operatively moving record device and contact means to perform a closing operation of said circuit, said contact means including pre-arranged contacts on the operatively moving record device, a contact bar, and brushes connected with said other separate means, said separate means embodying a contact arm on the said driving element and at least one stop contact which is closed in normal position but which is opened to stop said driving element when contact is made with it by said contact arm, said record device being intermittently operated by means comprising an electro-magnet having a common lead to the said stop contact and a lead to a power supply, a pair of drums over which said record device moves, a ratchet member attached to one of said drums and engageable by a pawl carried by a free ratchet arm on the machine, said ratchet arm being loaded by a spring and also carrying a peg to co-operate with said electro-magnet, and a spindle on which said one drum rotates having an arm mounted thereon, said latter arm being operatively connected by a rod associated with a rotating member forming part of one of said electro-magnetic friction clutches.

8. In an electrical system means comprising an electrical circuit including start and stop contacts, at least one eccentric having a connecting rod operatively connected with said reproducer device, said eccentric carrying an eccentric strap and having a contact portion co-operating with a stop contact, a first electro-magnetic clutch, a second electro-magnetic clutch, means including said first clutch means for driving said eccentric in a clockwise direction, means including said second clutch for moving said eccentric in a counter-clockwise direction, and means carried by the eccentric strap to act upon the eccentric to damp out momentum of moving parts, whereby when the eccentric is given a series of intermittent movement in any order and direction it remains locked in between said movements.

9. The combination with a reproducer device, of at least one eccentric having a portion operatively connected with said reproducer, said eccentric carrying friction means to act upon said eccentric at a selected position, said eccentric having a contact portion, and of an electrical circuit including a power source of supply, start and stop contacts, a first electro-magnetic clutch, a second electro-magnetic clutch, means including said first clutch means for driving said eccentric in a clockwise direction, and means including said second clutch for driving said eccentric in a counter-clockwise direction.

10. A combination as defined in claim 9, including a stationary shaft having a large diameter with respect to the eccentricity of the eccentric and on which said eccentric is rotatably mounted thereon to perform a large throw.

GEORGE MARK VALE.

REFERENCES CITED

The following references are of record in the file of this patent:

UNITED STATES PATENTS

| Number | Name | Date |
|---|---|---|
| 436,276 | Depoele | Sept. 9, 1890 |
| 1,641,344 | McLean | Sept. 6, 1927 |
| 1,940,957 | Larsh | Dec. 26, 1933 |
| 2,029,335 | Oberhoffken et al. | Feb. 4, 1936 |
| 2,325,102 | Boschen | July 27, 1943 |
| 2,369,828 | Humphreys | Feb. 20, 1945 |
| 2,398,519 | Clark | Apr. 6, 1946 |